Sept. 5, 1950     T. O. McCARTHY     2,520,948
PERFORMANCE RECORDER FOR DIRECTION INDICATORS
Filed Sept. 5, 1945     4 Sheets-Sheet 1

INVENTOR.
Thomas O. McCarthy
BY
Ralph L Chappell
ATTORNEY

INVENTOR.
Thomas O. McCarthy
BY
Ralph L Chappell
ATTORNEY

Sept. 5, 1950            T. O. McCARTHY            2,520,948

PERFORMANCE RECORDER FOR DIRECTION INDICATORS

Filed Sept. 5, 1945            4 Sheets-Sheet 4

INVENTOR.
Thomas O. McCarthy
BY
Ralph L. Chappell
ATTORNEY

Patented Sept. 5, 1950

2,520,948

UNITED STATES PATENT OFFICE 2,520,948

PERFORMANCE RECORDER FOR DIRECTION INDICATORS

Thomas O. McCarthy, United States Navy

Application September 5, 1945, Serial No. 614,584

3 Claims. (Cl. 346—2)

(Granted under the act of March 3, 1883, as amended April 30, 1928; 370 O. G. 757)

This invention relates to photographic recording devices and particularly to devices for photographically recording data for analyzing performance errors of direction indicators such as gyrocompasses and similar instruments under actual operating conditions while underway at sea or in the air.

Heretofore direction indicators such as gyrocompasses and similar instruments have generally been tested for errors in laboratories ashore, as it has not been practical to conduct such tests at sea or in the air, (depending on whether the direction indicator is used aboard ship or in an aircraft.) Under such laboratory conditions it has, therefore, not been possible to determine whether the performance errors found ashore are the same as those obtained under actual operating conditions at sea or in the air, and the assumption that these errors are the same in both cases has been open to grave doubt.

Hitherto it has also not been not practical to determine in a precise manner, at sea or in the air, whether such performance errors of direction indicators are of the same or different magnitudes while the ship or aircraft is pursuing different courses. For example, it has not been practical to determine precisely, while underway, whether the errors are the same on an east-west course as on a north-south course, or how these errors are affected by sudden reversals of course. The present invention seeks to overcome these obstacles.

One object of the present invention, accordingly, is to provide a performance recorder for direction indicators, such as gyrocompasses or similar instruments, wherein the data necessary for determining the errors thereof are recorded photographically while the ship or aircraft is underway and maneuvering at sea or in the air.

Another object is to provide a performance recorder for photographically recording the data necessary for the accurate determination of the errors of direction stabilizer systems wherein a directionally stable instrument, such as a compass, controls and causes to be directionally stable a device of considerable mass such as a gun, antenna, searchlight or projector, and receivers of various types.

Another object is to provide a means for measuring the inaccuracies of a servo-mechanism controlled by a remote control device where a reference mark or plane common to both cannot easily be seen or established; for example a gun remotely controlled in its motion by a distant director device located below the deck of the ship, as in the plotting room.

Another object is to provide a performance recorder for direction indicators which is mounted upon or operatively connected to the output shaft of a self-synchronous alidade or gyrocompass repeater whereby the recorder or its working parts are maintained automatically in bearing on or near a celestial body such as the sun while the various data for determining the errors of the direction indicator are recorlded photographically at suitable intervals, and at the will of the observer.

Another object is to provide an instrument for photographically recording the data for determining, while underway, the errors of a direction indicating or stabilizing system, including the time and number of the observation, the bearing of a heavenly or terrestial body as indicated by the direction indicating or stabilizing system, the bearing of the body relative to a reference mark on the ship, aircraft or vehicle, and the data necessary to correct the bearing of the body for the amount the plane through the line of sight differs from the true vertical plane through the body and to correct the true altitude of the celestial body to the altitude with reference to the direction indicator from which the observation is being taken.

Another object is to provide an accurate performance recorder for photographically recording all data necessary for determining the errors of a direction indicator or stabilizer as set forth in the preceding objects, and simultaneously and automatically recording the factors necessary for correcting the bearing measurements for crosslevel, i. e., for inaccuracies due to the nonvertical projection of the line of sight to a celestial body on the horizontal datum plane in which the direction is being measured, and to accomplish this by recording the amount the plane through the line of sight is tilted from the vertical by reference to the horizon at right angles to the line of sight.

Another object is to provide an accurate performance recorder for photographically recording all data necessary for determining the inaccuracies of a direction indicator or stabilizer as set forth in the preceding objects, and simultaneously and automatically recording the factors necessary for correcting the bearing measurements for level, i. e. for inaccuracies in the crosslevel determination due to the slant of the datum plane on which the bearing is measured away from the horizontal and about an axis at right angles to the line of sight to a celestial body from the center of the datum plane, and to accomplish this by photographically recording the attitude of that plane with reference to the horizon.

Another object is to provide a performance recorder for photographically recording the data necessary for determining the errors of a direction indicator as set forth in the preceding objects, and also preferably recording the tilt of the direction indicator by means of devices independent of the horizon, such as spirit levels, whereby observations can be taken and recorded while entering and leaving port or in other locations and under other conditions where a satisfactory view of the horizon is not easily obtainable.

Another object is to provide a performance recorder, as set forth in the preceding objects, that is provided with dials and/or verniers operatively connected to the output shaft of the direction indicator, such as the output shaft of a self-synchronous alidade, whereby the readings of these dials and/or verniers can be recorded photographically at suitable intervals, along with the cross-level and preferably also the level of the instrument, and the time and identifying number of each observation.

Another object is to provide a performance recorder for direction indicators wherein a sun telescope is mounted for automatic rotation in synchronism with the output shaft of the direction indicator, this telescope also having an independent adjustment whereby the cross lines of the telescope can be adjusted back to coincidence with the sun's image when an error of the direction indicator causes the cross lines to deviate from such coincidence, means being provided for indicating and photographically recording the amount that the sun telescope is moved with reference to the compass repeater, alidade or other directionally stabilized element.

Further objects and advantages of this invention, as well as its construction, arrangement and operation, will be apparent from the following description and claims in connection with the accompanying drawings, in which

Reference is hereby made to the related co-pending application Ser. No. 649,423, filed February 21, 1946 by Thomas O. McCarthy and John L. Maulbetsch.

General arrangement

In brief, the performance recorder as described herein includes a housing 19 mounted upon a direction indicator 11 (such as a self-synchronous alidade), the output shaft 20 of which rotates a bearing dial 42 within the housing and an optical cap thereon in one-to-one ratio. Independently mounted on the optical cap is a cross-level telescope 183, also a conventional sun telescope 12 connected to rotate a mirror mount within the optical cap 76 and also to rotate an azimuth dial adjacent the bearing dial when the telescope is rotated bodily with the optical cap or independently thereof by a tangent screw.

A pair of ports 77 and 78 ninety degrees apart in the optical cap admit light rays from the horizon, these being reflected downwardly by forty-five degree mirrors 88 and 89 in the mirror mount to a fixed forty-five degree mirror, which in turn reflects them into the objective of a photographic camera 123. The camera is also focused upon a panel containing the dials, an accurate watch 48, an exposure counter 63, and spirit levels 68 and 69 arranged to show the tilt of the instrument. A fixed vernier is arranged adjacent the dials to represent the position of the ship's head or center line. Optionally provided is an exposure meter 176 and an optical system for placing the horizon rays in focus with the dials, watch, counter and spirit levels. Illumination, such as electrical projection lamps 120, is provided for illuminating the dials and associated devices to be photographed.

The observations photographed by the camera are recorded upon a film 127. After the film is processed, a plot is prepared which indicates, for each exposure, the error of the direction indicator or stabilizer. The compass bearing of the sun, corrected for the cross-level and time of observation, is referred to the true bearing of the sun as computed by conventional navigational methods. The difference between the results thus obtained is the error of the direction indicator for the particular observation. By taking repeated observations at suitable time intervals the errors of the direction indicator can be charted or shown by graphs for different conditions of speed, courses steered, roll and pitch of ship or craft and acceleration forces due to changes in course or speed.

Instrument panel and connections

Figure 1:
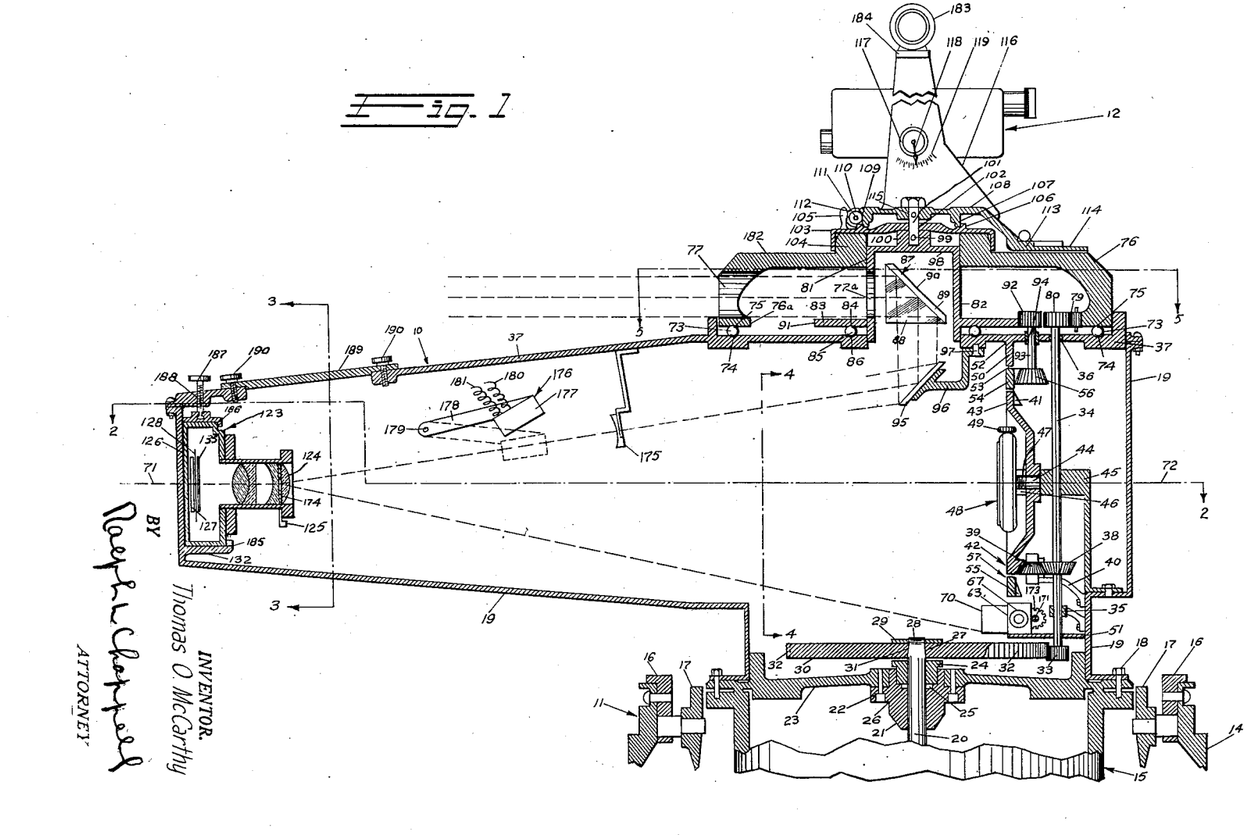
Fig. 1 is a central longitudinal vertical section through a preferred embodiment of the performance recorder of this invention.

Fig. 1 shows a performance recorder, generally designated 10, carrying a conventional sun telescope, generally designated 12, and mounted upon a direction indicator, generally designated 11, in this case shown as a conventional self-synchronous alidade operatively connected to and synchronized with the master gyrocompass of the ship, aircraft or vehicle upon which the test is to take place. The self-synchronous alidade is operatively connected to and synchronized with the master gyrocompass by a conventional arrangement of self-synchronous motors and generators working through an electronic torque amplifier. The self-synchronous generators, one single speed and one 36 speed, are driven by the azimuth motor of the master compass, which in turn is caused to follow, degree by degree, the movement of the ship (or plane) in azimuth, about the space-stabilized, sensitive, gyroscopic element of the compass. The azimuth motor drives the single and 36 speed synchro generators (self-synchronous generators) and they transmit electrical signals over two 3-wire circuits to the synchro receivers in the self-synchronous alidade. In the receiver the incoming signal is used to position the rotors of the control transformer (a conventional piece of synchro equipment) and the rotor picks off an induced-single phase signal, which signal is fed into an electronic amplifier and used to control currents of sufficient amplitude to drive induction motors. These induction motors drive the substantial load to the indicating mechanism of the self-synchronous alidade and cause it to "follow" the master compass degree for degree to an accuracy of 0.01 of a degree. The self-synchronous alidade 11 is a gyrocompass repeater having an amplifier for imparting power sufficient to rotate the sun telescope 12 so as to keep it substantially in bearing on the sun or other celestial body, or upon a suitable landmark, as the case may be.

The direction indicator 11, however, can consist of a magnetic compass rather than a gyrocompass, with suitable means for amplifying the torque of the compass card and synchronizing the motion of the sun telescope 12 therewith. It can also consist of any remotely-controlled rotatable device whose performance is to be recorded, such as a gun, gun director, range finder, directional projector of heat, light or sound waves or radio-electric energy, or a directionally stabilized receiver thereof.

The direction indicator 11 is mounted on a supporting stand (not shown) which in turn is mounted on the ship's deck. The stand is provided with a bowl 14 (Fig. 1) containing a repeater assembly 15 that responds to the motion transmitted from the master gyrocompass. The repeater assembly 15 is mounted in the bowl 14 by means of gimbal rings 16 and 17 to allow for roll and pitch of the ship.

Mounted upon the repeater assembly 15 and secured thereto as by the cap screws 18 (Fig. 1) is a performance-recorder housing 19. The latter contains the working parts of the invention and also supports the sun telescope 12. The moving parts of the performance recorder 10 are driven from the output shaft 20 of the direction indicator 11, this output shaft 20 being rotated in synchronism with the compass card of the ship's master gyrocompass by a conventional electrical system. The output shaft 20 is mounted rotatably in an upper bearing 21 secured as at 22 to the repeater cover 23 (Fig. 1). A nut 24 compresses a cover packing ring 25 seated in an annular recess 26 in the upper bearing 21.

The output shaft 20 is provided at its upper end with a tapered portion 27 terminating in a threaded portion 28 adapted to receive a shaft nut 29. Normally, the output shaft of the direction indicator 11, when used as a self-synchronous alidade, carries a disc (not shown) provided with an annular scale divided into degrees. In using the present invention, however, this disc is removed and a gear 30 substituted therefor. The gear 30 is provided with a tapered bore 31 mating with the tapered portion 27 and secured in position by the shaft nut 29.

The gear 30 is provided with peripheral teeth 32 (Fig. 1) meshing with a pinion 33 mounted on a vertical shaft 34 supported at its lower end by a bearing bracket 35 bolted to the housing 19 and at its upper end in a bearing 36 mounted in the cover plate 37 of the housing 19. The shaft 34 carries a pinion 38 meshing with a bevel idler 39 mounted in a bearing bracket 40 bolted to the housing 19. The idler 39 meshes with annular gear teeth 41 on the periphery of the bearing dial 42 (Figs. 1 and 4), which is provided with graduations 43 in degrees. The bearing dial 42 is mounted upon a stud 44 projecting from a bracket 45 bolted to the housing 19 and secured in position by a nut 46 threaded upon the threaded portion 47 of the stud 44.

Secured to the end of the stud 44 is a timer 48, such as an accurate watch, for determining the time of the observations. The timer 48 is maintained in substantial agreement with the ship's chronometer, and its readings corrected according to its known errors. The timer 48 preferably reads in Greenwich civil time. Since the stud 44 does not rotate, the timer 48 is stationary, but is attached removably to the stud 44 in any suitable manner (not shown) so that it can be removed conveniently and another timer substituted.

Figures 4, 8:
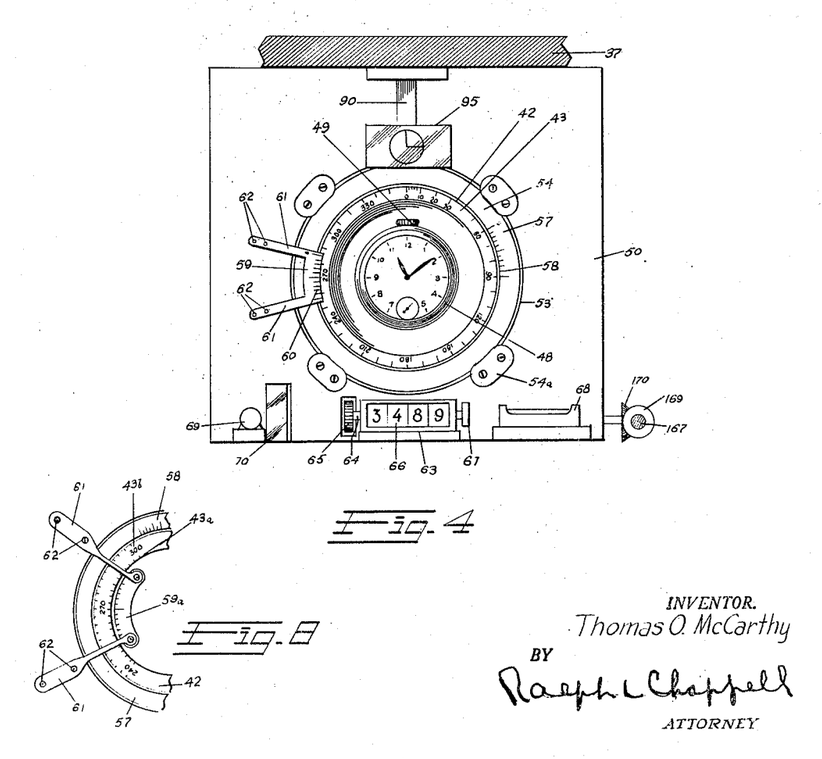
Fig. 4 is a vertical cross section taken along the line 4—4 of Fig. 1, showing the instruments to be photographed, the relative size of a few of the parts being inconsequentially changed from the relative sizes shown in Fig. 1.
Fig. 8 is a fragmentary front elevation of a modification of Fig. 4.

Secured as at 51 and 52 to the housing 19 and cover plate 37 in substantially the same plane as the timer 48 is a plate or instrument panel 50 (Figs. 1 and 4). The plate 50 is provided with a circular opening 53 within which an annular azimuth index dial 54 is mounted rotatably by retaining members 54a secured to the plate 50. The dial 54 is provided with bevel gear teeth 55 and is driven from a bevel pinion 56. The azimuth index dial 54 carries an arcuate azimuth index vernier 57 (Fig. 4) having graduations 58 reading upon the graduations 43.

Mounted adjacent the graduations 43 is a fixed ship's head index 59 having vernier graduations 60 reading upon the graduations 43 and representing the position of the ship's head as indicated by the jackstaff or center line of the ship. The ship's head index 59 is supported by arms 61 (Fig. 4) secured as at 62 to the plate 50.

In the modification of Fig. 8, the ship's head index 59a is mounted inside the bearing dial to read upon the inner graduations 43a thereof whereas the graduations 58 of the azimuth index 57 read upon the duplicate outer graduations 43b. This prevents the azimuth index graduations 58 from ever being hidden beneath the ship's head index 59 as is possible, though improbable, in the arrangement of Fig. 4.

The position of the ship's head index 59 is immaterial so long as the bearing dial 42 and gear 30 are properly positioned. In other words, when the ship is underway on a zero course, the zero graduation of the bearing dial 42 should coincide with the zero graduation of the ship's head vernier 59. Furthermore, if the ship were steering a zero course in a latitude south of the equator and the sun happened to be dead ahead at the time, the zero of the azimuth index 57 would coincide both with the zero of the ship's head index 59 and the zero of the bearing dial 42, assuming that there were no errors in the direction indicator 11. It would be useful to place the ship's head index 59 immediately above the winding stem 49 but in the present installation it would be concealed by a mirror later to be described.

Figure 2:
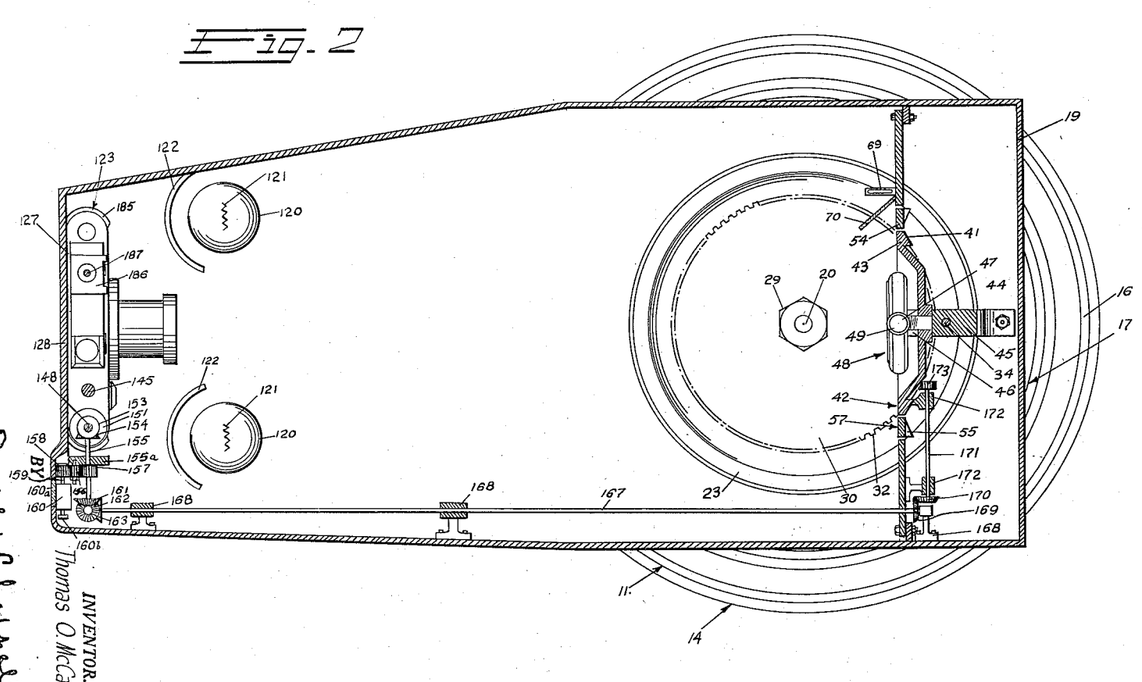
Fig. 2 is a horizontal section taken along the line 2—2 of Fig. 1.

Likewise mounted upon the plate 50 is a counter 63 (Fig. 4) having an operating shaft 64 carrying a pinion 65, which is actuated from the photographic rewind mechanism in a manner subsequently to be described. The counter 63 is a well known conventional type operated mechanically and having numerals 66 that identify the particular observation at the time of photographing. The counter 63 is also provided with a rewind knob 67 for resetting the counter when desired. The housing 19 is provided with a suitable access opening or hand hole (not shown) through which the timer 48 can be reached and wound by means of its winding stem 49 and the counter 63 reset by means of its rewind knob 67, Likewise mounted on or adjacent to the plate 50 (Fig. 4) are conventional spirit levels consisting of an athwartship indicator 68 and a fore-and-aft indicator 69. The former is positioned parallel and the latter perpendicular to the plate 50. The fore-and-aft indicator 69 is additionally provided with a forty-five degree mirror 70 (Figs. 2 and 4) whereby it is made visible to an observer looking in the direction of the timer 48.

The longitudinal axis 71—72 of the performance recorder 10 (Fig. 1) preferably is arranged in a fore-and-aft direction, preferably in the center line of the ship. If the instrument is arranged outboard of the center line of the ship and a centerline reference mark such as the jackstaff is used, a correction for parallax must be introduced in positioning the ship's head index 59. Thus the bubbles of the athwartship indicator 68 and fore-and-aft indicator 69 show, with respect to the graduations upon their tubes, the tilt of the performance recorder 10 both athwartships and fore-and-aft.

*Telescope and optical system*

Figure 5:
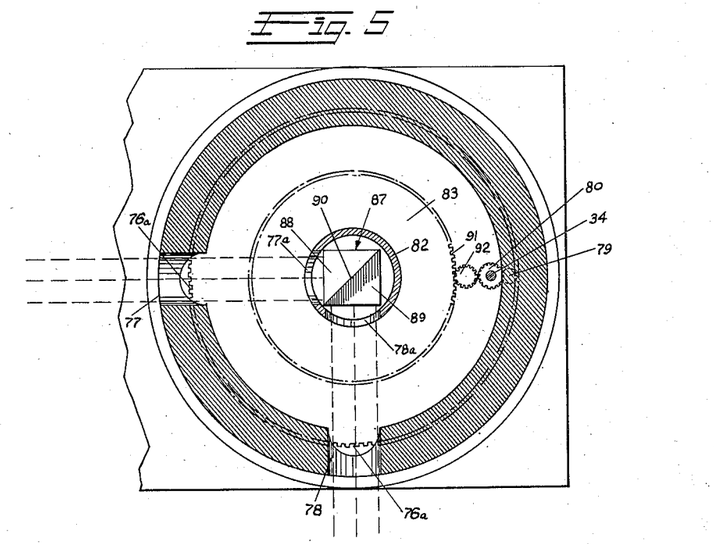
Fig. 5 is a horizontal section taken along the line 5—5 in Fig. 1.

Mounted rotatably upon the cover plate 37, as by the anti-friction bearings 73 (Fig. 1) operating in annular grooves 74 and 75, is an optical cap 76. This contains a pair of ports 77 and 78 (Fig. 5) arranged ninety degrees apart so as to admit rays from the horizon in level and cross-level respectively. The optical cap 76 is provided with internal gear teeth 76a with which mesh the teeth of an idler pinion 79 driven by a pinion 80 mounted upon the upper end of the shaft 34. In this manner the optical cap 76 is rotated in response to the rotation of the output shaft 20 of the direction indicator 11.

Figure 6:
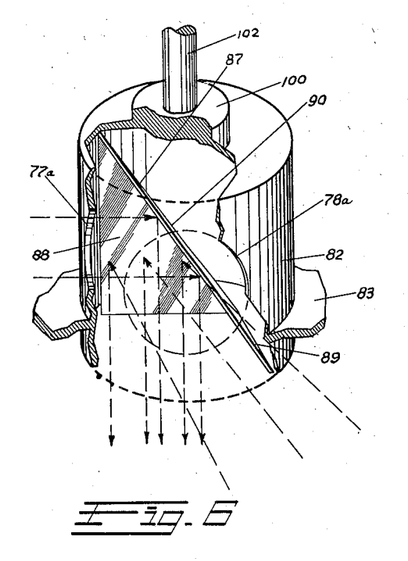
Fig. 6 is a perspective view of the rotary mirror assembly in Fig. 5.

The optical cap 76 is provided with an axial bore 81 within which is mounted rotatably a tubular mirror mount 82 having a flanged portion 83 containing an annular groove 84 resting upon anti-friction bearings 85, which in turn run in an annular groove 86 formed in the cover plate 37. The mirror mount 82 is provided with ports 77a and 78a aligned respectively with the ports 77 and 78. It also contains a rotary mirror assembly 87 (Figs. 1 and 6) consisting of a pair of mirrors 88 and 89 disposed substantially in the axis of rotation of the mirror mount 82 and arranged substantially at forty-five degree angles to the horizon rays entering the ports 77 and 78 so as to reflect these rays downwardly parallel to the axis of rotation of the mirror mount 82. Consequently the mirrors are approximately of triangular shape and intersect along the diagonal line 90.

The periphery of the flanged portion 83 of the mirror mount 82 is provided with gear teeth 91 meshing with a pinion 92 upon the upper end of a shaft 93. The latter is rotatably supported at 94 in the cover plate 37 and on its lower end carries the bevel pinion 56. Disposed below the rotary mirrors 88 and 89 is a fixed mirror 95 mounted upon a bracket 96 secured as at 97 to the cover plate 37 (Fig. 1). The mirror 95 is arranged with its plane substantially at forty-five degrees to the rays reflected downwardly from the rotary mirrors 88 and 89.

The end portion 98 of the mirror mount 82 has a collar 100 pinned as at 99 to a shaft 101 which extends upwardly through a bore 102 in a cup-shaped telescope support 103 (Fig. 1) that mates with and is mounted rotatably upon a cylindrical boss 104 projecting upwardly from the optical cap 76. The telescope support 103 is provided with handle 105 whereby it can be rotated by the operator. The telescope support 103 is also provided with an annular seat 106 for rotatably receiving the cylindrical portion 107 of the telescope mount 108.

The cylindrical portion 107 is provided with an arcuate worm gear portion 109 which is engaged by a worm 110 mounted upon a tangent screw shaft 111 and rotatable by means of a knob 112. The tangent screw shaft 111 is mounted in suitable bearings (not shown) and provides a fine adjustment for rotating the telescope mount 108 relatively to the telescope support 103. The telescope mount 108 is provided with an outwardly projecting portion 113 which normally carries a vernier 114. The shaft 101 enters a bore 115 in the telescope mount 108 and is pinned thereto so that when the sun telescope 12 is swung to and fro, this motion is transmitted through the shaft 101 to the mirror mount 82.

Rising from the telescope mount 108 are spaced arms 116 carrying trunnions 117 upon which the sun telescope 12 is supported. A pointer 118 secured to the telescope 12 at its axis of support cooperates with an arcuate degree scale 119 in such a manner as to indicate the amount of tilt of the sun telescope 12. The latter is provided with a reticle (not shown) preferably having central cross lines and vertical stadia lines spaced at equal distances from the central vertical cross line and on opposite sides thereof. The spaced vertical stadia lines are separated by the angular distance subtended by the sun's disc. An observer can measure the altitude of the sun above the horizon with a sextant and swing the sun telescope 12 about its trunnions 117 until the pointer 118 indicates the same altitude upon the scale 119. Another observer looking through the telescope 12 will then find that the stadia lines thereof are substantially aligned upon the opposite edges of the sun's disc, provided of course that the sun telescope 12 is rotated to the correct azimuth. The sun telescope 12 is provided with the usual ray filters or crossed polarizing plates (not shown) to cut down the intensity of the sun's image and avoid injury to the eyes of the observer.

*Photographic system*

To illuminate the plate 50 and its associated dials and instruments (Fig. 2), the housing 19 is provided with suitable incandescent bulbs 120 having filaments 121 energized from any suitable source of electricity. The bulbs 120 can be of a type used in small motion picture projectors. Curved reflectors 122 are provided to concentrate the light from the filaments 121 and direct it toward the plate 50. The reflectors 122, at the same time, prevent extraneous light from reaching the photographic apparatus.

Figure 3:
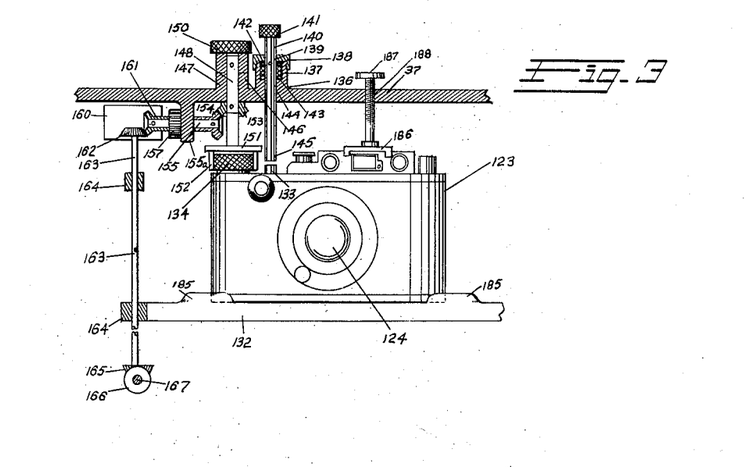
Fig. 3 is a vertical cross section taken along the line 3—3 of Fig. 1.
Figure 7:
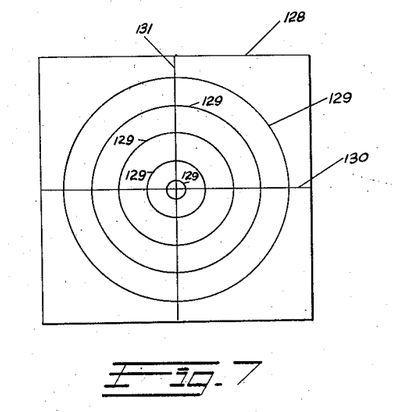
Fig. 7 is a front elevation of the shadow reticle used in the camera.

Arranged in the forward end of the housing 19 is a photographic camera, generally designated 123, for photographing the plate 50 with its associated dials and instruments and also the images of the horizon in cross-level and level as reflected by the mirrors 88, 89 and 95. The camera 123 can be of any suitable type, the type known by the trade name "Leica" being convenient for this purpose. The details of the camera 123 are conventional and form no part of the present invention. The camera 123 is provided with an objective 124 which is focused by a focusing knob 125 so that it will produce a sharp image of the plate 50 and its associated dials and instruments and also of the horizon in the focal plane 126 of the camera 123 (Fig. 3), where the film 127 is located. The film 127 is preferably in the form of an elongated strip wound upon a spool contained in a magazine or other suitable holder. Mounted immediately adjacent the focal plane 126 and covering the film 127 (Figs. 1 and 2) is a thin shadow reticle plate 128. The latter (Fig. 7) is of transparent material and is provided with a series of concentric circular lines 129 together with perpendicular horizontal and vertical cross lines 130 and 131. The lines 129, 130 and 131 are opaque and serve as masks to cast a similar shadow upon the film 127.

The camera 123 is supported on a mount 132 and is provided with the usual exposure button 133 and film and shutter rewind knob 134. Any suitable shutter can be employed, but the type of camera described uses a focal plane shutter 135 which is mechanically connected to the film rewind knob 134 so that the shutter is rewound at the same time that the rewind knob 134 is rotated to remove the exposed portion of the film 127 and transport an unexposed portion thereof into the focal plane 126.

The cover plate 37 of the housing 19 (Fig. 3) has a boss 136 thereon provided with a recess 137 covered by a screw cap 138 containing a bore 139 through which the exposure rod 140 passes, its upper end carrying the exposure button 141. Secured to the exposure rod 140 is an enlargement such as a disc 142 beneath which is arranged a compression coil spring 143 within the recess 137. The boss 136 is provided with a vertical bore 144 leading downwardly from the recess 137 for the passage of the exposure rod 140, the lower end 145 of which is arranged to engage and operate the exposure button 133 when the exposure button 141 is depressed.

The cover plate 37 is provided with a second boss 146 (Fig. 3) having a vertical bore 147 in which is rotatably mounted the rewind shaft 148. Pinned to the shaft 148 is a film and shutter rewind knob 150. The lower end of the shaft 148 carries an adapter 151 having portions 152 tightly engaging the film rewind knob 134, which can be provided with cooperating flattened portions or grooves to assist this mechanical connection. Consequently, when the film rewind knob 150 is turned, this motion is transmitted to the rewind knob 134 so that the film 127 is rewound while the focal plane shutter is likewise rewound.

Also secured to rewind shaft 148 is a bevel pinion 153 which meshes with a bevel pinion 154 secured to a shaft 155. Said shaft 155 is supported rotatably in a bearing bracket 155a extending downwardly from the cover plate 37. Secured to the shaft 155 is a pinion 157 which meshes with an idler pinion 156 driving a pinion 158 (Fig. 2) secured to the operating shaft 159 of a conventional auxiliary counter 160. The counter 160 is positioned to be visible through a window 160a in the housing 19. The counter 160, like the counter 63, is provided with a resetting knob 160b.

Secured to the outer end of the shaft 155 (Figs. 2 and 3) is a bevel pinion 161 meshing with a bevel pinion 162 secured to a shaft 163. The latter is supported rotatably in bearing brackets 164 and to its opposite end is secured a pinion 165 meshing with a pinion 166 secured to a horizontal shaft 167 rotatably supported in bearing brackets 168 secured to the housing 19. Secured to the opposite end of the shaft 167 is a bevel pinion 169 (Fig. 2) meshing with a bevel pinion 170 secured to a shaft 171. The latter is mounted rotatably in bearing brackets 172 secured to the plate 50. The opposite end of the shaft 171 carries a pinion 173 meshing with the pinion 65 on the operating shaft 64 of the counter 63. In this manner the counters 63 and 160 are operative to show a new number each time that the film and shutter rewind knob 150 is turned to transport the film and rewind the focal plane shutter of the camera 123.

It will be observed (Fig. 1) that the plate 50 and its associated dials and instruments are located relatively near to the camera objective 124 whereas the rays coming through the ports 77 and 78 in the optical cap 76 are proceeding from the horizon located at infinity. Assuming that an objective 124 of sufficiently short focus and substantially stopped down is provided, as by closing the iris diaphragm 174, the objective 124 can be given a sufficient depth of focus to focus accurately the plate 50 and the infinitely distant horizon.

If the objective 124 is used at full aperture, however, some compensating means must be used to place the horizon and the plate 50 at substantially the same apparent distance from the camera objective 124. This can be done by placing a concave or negative lens system 175 in the path of the rays reflected from the fixed mirror 95 to the camera objective 124. The negative lens system 175 should be so positioned and of such focal length that its principal focus coincides with the plane of the plate 50. Thus the parallel rays coming from the infinitely distant horizon and reflected from the fixed mirror 95 are transformed by the negative lens system 175 so that the rays apparently diverge from the plane of the plate 50. By this means the plate 50 and the horizon will be simultaneously in sharp focus.

In order to regulate the intensity of the illumination on the plate 50, suitable rheostats (not shown) can be provided to control the current energizing the filaments 121 of the bulbs 120. The intensity of the light entering the ports 77 and 78 is controlled by conventional means such as diaphragms, filters, polarizers or the like (not shown).

An exposure meter 176 consisting of a photoelectric cell unit 177 mounted upon an offset swinging arm 178 pivotally mounted as at 179 upon the housing 19 is optionally provided. The photoelectric cell unit 177 is connected by wiring 180 and 181 to a conventional amplifying and indicating system (not shown). By means of the arm 178 the photoelectric cell unit 177 can be swung into and out of the path of the light rays coming from the horizon and the correct exposure determined for the prevailing light conditions.

To maintain the instrument in cross-level, a cross-level telescope 183 (Fig. 1) having a reticle with a horizontal cross line (not shown) is mounted upon the cross bar 184 interconnecting the top ends of the arms 116 with its line of sight perpendicular to the line of sight of the sun telescope 12. Conventional adjusting means (omitted to simplify the disclosure) such as shims are provided to line up the cross-level telescope 183, mirror 95 and lens 115. The camera 123, which is conventional and is therefore shown somewhat diagrammatically, is held in position upon the mount 132 by means of U-shaped end bosses 185 (Figs. 1 and 3) cooperating with a hold-down pad 186 and screw 187. The latter is threaded through a bore 188 in the cover plate 37. An access plate 189 secured by screws 190 to the cover plate 37 permits removal of the camera 123.

Operation

Preliminary to the operation of the performance recorder 10, it is assumed that the proper adjustments have been made so that the bearing dial 42 and azimuth index 57 read properly relatively to the zero of the ship's head index 59. The timer 48 is also carefully checked by the ship's chronometer and installed in its proper position (Fig. 1). The camera 123 is loaded with a suitable supply of film and is inserted in its mount 132 and secured rigidly. The sun telescope 12 is also adjusted properly and the direction indicator 11 precessed so as to bring the cross wires of the telescope 12 into alignment with the jackstaff of the ship, assuming that the direction indicator 11 is mounted on the center line of the ship. If it is mounted to one side of this center line and the jackstaff is still used for alignment, the position of the ship's head index 59 must be corrected for parallax.

The ship's head index 59 is now adjusted to read the true bearing of the ship's head by the bearing dial 42. The sun telescope 12 is then trained at a definite angle on either bow and the azimuth index 54 adjusted so that the bearing of the telescope 12 reads the same angle as the angle to which the telescope 12 is trained, and in the same direction. Meanwhile the tangent screw worm 110 is adjusted by the knob 112 so that it lies approximately midway in the arcuate worm gear teeth 109, so as to permit an adjustment of about four or five degrees in either direction.

It is furthermore assumed that the level and cross-level optical systems have been lined up with reference to a surface plate and a transit prior to the removal of the instrument from the shop.

The electrical cables for supplying current to the illumination bulbs 120 are connected to a source of electricity and the observations are ready to be proceeded with. Ordinarily the iris diaphragm 174 of the camera 123 will be set in its wide open position and the adjustment of exposure made by regulating the shutter speed. The ray filters, diaphragms or stops, or other suitable means for regulating the intensity of the light coming from the horizon through the ports 77 and 78 are adjusted so that the proper light intensity is obtained, and the photoelectric cell unit 177 of the exposure meter 176 is swung into the path of these rays and the proper exposure determined. As the illumination of the plate 50 and its associated dials and instruments will be of a substantially constant value, the shutter speed will be regulated for this value. Extensive experience with the invention has demonstrated that the intensity of the daylight can be controlled suitably to match the artificial illumination of the plate 50, within the latitude of the film, and very satisfactory film negatives obtained under practically all operating conditions.

The direction indicator 11 (such as a self-synchronous alidade) is now cut in on the gyrocompass system, the illumination turned on, the counters 63 and 160 set at zero and the sun telescope 12 adjusted so that its spaced vertical stadia lines span the sun's disc. The performance recorder 10 is steadied in cross-level by the cross-level observer sighting through the cross-level telescope 183 and holding the cross line of the reticle thereof upon the horizon at right angles to the line of sight to the sun.

Assuming that the film 127 has been transported into position to make the first exposure, the first observation is then recorded by depressing the exposure button 141. The latter can be provided with a flexible cable release of a conventional type (not shown). After the exposure is thus obtained, the film is transported and the shutter rewound by turning the film rewind knob 150. This action also moves the counters 63 and 160 ahead one unit. The next observation is photographed in a similar manner. These operations are repeated at suitable intervals, such as a few seconds apart, over a period of several hours, as the film magazine ordinarily holds several hundred exposures.

Meanwhile the direction indicator 11 will maintain the spaced vertical stadia lines of the sun telescope 12 very closely in alignment with the opposite edges of the sun's disc. Errors in the direction indicator 11 or the gyrocompass system will cause these stadia lines to deviate from such alignment with the sun's disc, and this deviation is a measure of the error to be determined. When, due to this error, the stadia lines drift away from alignment with the opposite edges of the sun's disc, the operator brings them back into alignment by turning the knob 112 operating the tangent screw worm 110. When the image of the sun's disc is fairly braced between the vertical stadia lines, the center of the sun's disc coincides with the central vertical cross line. When the operator turns the tangent screw knob 112 he automatically shifts the azimuth index 57 and the rotary mirror unit 87 used for establishing the cross-level and level corrections.

Ordinarily, observations are taken with the ship steering various courses and during the turns made as a result of changing courses. Under such conditions it is found that the gyrocompass oscillates and produces errors, particularly when the helm is put hardover and a sharp turn executed. The observations thus photographed enable these errors to be accurately determined.

When the observations are completed and the film has been processed, a pot is prepared which, for each exposure, will indicate the error of the gyrocompass and self-synchronous alidade systems, assuming that the latter is used as the direction indicator 11. The compass bearing of the sun, corrected for the cross-level and time of observation, is referred to the true bearing of the sun as computed and readily available according to methods set forth in various Naval Hydrographic Office publications. The difference between the two bearings is the error of the direction indicator which it is desired to obtain. These errors are plotted against the time and for each course, and a running record of the variation of these errors is thereby obtained. From these graphs the performance of the particular direction indicator 11 can be determined accurately under varying conditions and a permanent record obtained under water-borne or air-borne operating conditions.

The construction and operation of the instrument has been particularly described in connection with its installation aboard a ship. It will be understood, however, that the same instrument can be employed to determine the errors of direction indicators mounted upon aircraft or upon land vehicles, following an analogous procedure.

It will be further understood that a terrestrial landmark, if available, can be, and frequently is, used instead of a celestial body. The operational procedure is the same in taking observation but a different method of computation must be used to determine the true direction of the landmark from the observer at the instant the observation is made.

Definitions

In the specification and claims hereof it will be understood that the use of the term "sun" comprehends other celestial bodies such as stars or planets, the sun being the most conveniently used body and the one most frequently selected.

The term "compass" as used herein is defined as a device having means for maintaining itself in a substantially constant angular relationship with the projection of the earth's axis on the horizontal plane at the location of the device.

The term "level" as used herein is defined as the angular tilt of an assumed datum plane of the instrument, such as the compass card, about a horizontal axis perpendicular to the line of sight of the sun telescope.

The term "cross-level" as used herein is defined as the angular tilt of an assumed datum plane of the instrument, such as the compass card, about a horizontal axis in the line of sight of the sun telescope.

Various modifications and changes can be made in the subject device without departing from the scope of the invention.

The invention described herein may be manufacured and used by or for the Government of the United States of America for governmental purposes without the payment of any royalties thereon or therefor.

I claim:

1. An instrument for recording the performance characteristics of a direction indicator having a movable direction-indicating element, said instrument comprising a ship's bearing indicator adapted to be rotated by said element, a stationary index representing a fixed point of reference on the ship adjacent thereto, a rotatable support adapted to be driven by said element, a sun's azimuth finder mounted on said support, a sun's azimuth indicator carried by said finder, optical means mounted on said azimuth finder for transmitting horizon rays in cross-level and level, a time indicator, and means for simultaneously recording the readings of said indicators and the transmitted image formed by said horizon rays.

2. An instrument for recording the performance characteristics of a direction indicator having a movable direction-indicating element and having an output shaft, said instrument comprising a housing mounted upon such direction indicator, a bearing dial within said housing rotated by such shaft in one-to-one ratio, an optical cap on said dial, a cross-level telescope mounted independently on said cap, a sun telescope linked to a mirror mount within said cap to rotate said mirror mount, and linked to an azimuth dial adjacent said bearing dial to rotate said azimuth dial with said optical cap, means to rotate said azimuth dial independently of said telescope, a pair of ports in said cap spaced 90 degrees apart, said ports being adapted to admit light rays from the horizon so that such rays are reflected by said mirror mount into a field of view within said housing, a panel in said housing in said field of view, said panel carrying said dials, a watch, an exposure counter and a plurality of spirit levels arranged to show the tilt of the instrument, a fixed vernier adjacent said dials and in said field of view, said vernier representing the position of the ship's head, means to illuminate said field of view, and means to photograph said dials and devices in said field of view.

3. The combination recited in claim 2 and an optical system carried in said housing, said optical system being adapted to place said horizon rays in focus with the dials and devices that appear in said field of view.

THOMAS O. McCARTHY.

REFERENCES CITED

The following references are of record in the file of this patent:

UNITED STATES PATENTS

| Number | Name | Date |
| --- | --- | --- |
| 790,871 | Camden | May 23, 1905 |
| 1,073,832 | Wlodzimirski | Sept. 23, 1913 |
| 1,223,686 | Frisch | Apr. 24, 1917 |
| 1,432,570 | Roux | Oct. 17, 1922 |